United States Patent
Martin et al.

(10) Patent No.: US 10,931,346 B2
(45) Date of Patent: Feb. 23, 2021

(54) TECHNIQUES FOR USING ROTATION VECTORS FOR BEAM MANAGEMENT IN HIGH FREQUENCY WIRELESS NETWORKS

(71) Applicant: QUALCOMM Incorporated, San Diego, CA (US)

(72) Inventors: Russel Martin, Menlo Park, CA (US); Vidyut Naware, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/281,921

(22) Filed: Feb. 21, 2019

(65) Prior Publication Data

US 2020/0274590 A1    Aug. 27, 2020

(51) Int. Cl.
*H04B 7/06* (2006.01)
*H04W 64/00* (2009.01)

(52) U.S. Cl.
CPC ........ *H04B 7/0617* (2013.01); *H04W 64/006* (2013.01)

(58) Field of Classification Search
CPC . H04W 64/006; H04B 7/0617; H04B 7/0608; H04B 7/0602
USPC ........................................................ 370/329
See application file for complete search history.

(56) References Cited

U.S. PATENT DOCUMENTS

| | | | | |
|---|---|---|---|---|
| 2006/0152410 A1* | 7/2006 | Shi | ............ | H01Q 3/26 342/359 |
| 2006/0240866 A1* | 10/2006 | Eilts | ......... | H01Q 3/08 455/556.1 |
| 2015/0185002 A1* | 7/2015 | Yang | ...................... | G01C 19/00 702/151 |
| 2017/0059688 A1* | 3/2017 | Gan | .......... | H01Q 3/28 |
| 2017/0214446 A1* | 7/2017 | Rappaport | ........... | H04B 7/0617 |

FOREIGN PATENT DOCUMENTS

WO    2018064627 A1    4/2018

OTHER PUBLICATIONS

International Search Report and Written Opinion—PCT/US2020/019121—ISAEPO—dated May 26, 2020.

* cited by examiner

*Primary Examiner* — Kwang B Yao
*Assistant Examiner* — Syed M Bokhari
(74) *Attorney, Agent, or Firm* — Thien T. Nguyen (57) ABSTRACT

Methods, systems, computer-readable media, and apparatuses for beam management in a wireless communication system are presented. In some embodiments, a beam management subsystem in a moveable device selects a first antenna array and forms a first beam using the first antenna array for sending and receiving communication signals from a base station or other transceiver. A communication signal processing subsystem receives a first communication signal via the first beam. Upon movement of the moveable device, an inertial navigation subsystem determines a rotation vector associated with the movement. In response to the inertial navigation subsystem determining the rotation vector, the beam management subsystem selects a second antenna array using the rotation vector and forms a second beam directed toward the base station using the second antenna array. The communication signal processing subsystem can receive a second communication signal via the second beam.

21 Claims, 6 Drawing Sheets

TECHNIQUES FOR USING ROTATION VECTORS FOR BEAM MANAGEMENT IN HIGH FREQUENCY WIRELESS NETWORKS

BACKGROUND

1. Field

Aspects of the disclosure relate to beam management in a high frequency wireless communication network.

2. Information

In wireless communication networks, antennae are used to transmit and receive signals between devices. At low and mid frequency ranges, the radiation pattern of the antennae allows for transmission and reception of signals at all or wide angles. However, when using high frequency, such as in millimeter wave (mmWave) communication networks, such as 5th generation (5G) networks, the radiation pattern of antennae form a directional beam for reception and transmission of signals. To send and receive signals between two devices in a mmWave communication network, the directional beam from one device must be oriented toward the other device.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for beam management. The method may include selecting a first antenna array of a moveable device. The first antenna array may be selected by a beam management subsystem of the moveable device. The beam management subsystem may form a first beam using the first antenna array. The first beam may be directed toward (i.e., oriented toward) a transceiver (e.g., a base station). The first beam may be used to receive a first communication signal from the transceiver. An inertial navigation subsystem of the moveable device may determine a rotation vector associated with a movement of the moveable device. The inertial navigation subsystem may include one or more inertial navigation sensors. In response to the inertial navigation subsystem determining the rotation vector, the beam management subsystem may select a second antenna array from the multiple antenna arrays using the rotation vector. The beam management subsystem may form a second beam using the second antenna array and the rotation vector. The second beam may be directed toward the transceiver. The second beam may be used to receive a second communication signal from the base station. Other embodiments of this aspect include corresponding computer systems, apparatus, and computer programs recorded on one or more computer storage devices, each configured to perform the actions of the methods.

Implementations may include one or more of the following features. In some embodiments, forming the second beam includes calculating a relative direction of the transceiver from the moveable device using the rotation vector. In some embodiments, the one or more inertial navigation sensors include one or more of an accelerometer, a gyroscope, and a magnetometer. In some embodiments, the rotation vector indicates a relative orientation of the moveable device. In some embodiments, the rotation vector indicates an absolute orientation of the moveable device. In some embodiments, selecting the second antenna array includes mapping, using the rotation vector, the movement of the moveable device to a subset of possible beams. The subset of possible beams may include the second beam. In some embodiments, the first antenna array and the second antenna array are the same antenna array. In some embodiments, the first antenna array and the second antenna array are different antenna arrays. In some embodiments, the rotation vector characterizes rotational movement of the moveable device. The rotational movement can include a change in at least one of roll, pitch, and yaw. In some embodiments, the rotation vector characterizes rotational movement of the moveable device and translational movement of the moveable device. In some embodiments, selecting the second antenna array includes predicting, using the rotation vector, a future orientation of the moveable device.

In some embodiments, selecting the second antenna array may include calculating a direction of the transceiver in relation to the moveable device using the rotation vector. The beam management subsystem may further map the direction of the transceiver to a subset of possible beams associated with a subset of the antenna arrays. The beam management subsystem may also scan the subset of possible beams to identify the strongest beam for communicating with the transceiver by identifying configuration parameters for the strongest beam. The beam management subsystem may then form the strongest beam by setting the configuration parameters of the associated antenna array. Implementations of the described techniques may include hardware, a method or process, or computer software on a computer-accessible medium.

BRIEF DESCRIPTION OF THE DRAWINGS

Aspects of the disclosure are illustrated by way of example. In the accompanying figures, like reference numbers and symbols in the various figures indicate like elements, in accordance with certain example implementations. Non-limiting and non-exhaustive aspects are described with reference to the following figures.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Some example techniques for using a rotation vector for beam management in a high frequency wireless network are described herein. The techniques may be implemented at the user equipment ("UE") or any other suitable moveable device, a base station, and/or other devices.

A moveable device may comprise a mobile phone, smartphone, tablet or other mobile computer, a portable gaming device, a personal media player, a personal navigation device, a wearable device, an in-vehicle device, a shipment tracking device, or any other electronic device. Beam management of a moveable device is used to maintain quality of signal strength for communication signals. As a moveable device moves (e.g., rotates, shifts, and so forth) the directional beam formed with the antenna array may stop pointing toward the base station (or transceiver or any other device with which the moveable device is communicating), and the signal may degrade as a result of this movement. Beam management algorithms scan available beams to optimize the beam used to communicate with the base station at any given time. This optimization may occur rapidly and frequently (e.g., 100 Hertz). Using inertial navigation sensors, a rotation vector can be generated to determine the movement of the moveable device. The rotation vector can be used to enhance the optimization by reducing processing time and reducing bandwidth used related to the scans performed for the optimization process. Further, without a rotation vector to initiate the optimization, signal degradation may be used to trigger the optimization. By using the rotation vector, the signal remains strong and optimized because the movement of the moveable device will trigger the optimization process before the signal degrades. While described herein as communication between a moveable device and a base station, the communication may be between a moveable device and a second moveable device (such as a UE). As one moveable device moves, the signal may degrade between it and the other moveable device. Therefore, the techniques described herein may also be applied between two moveable devices. Note that if the distance between the two moveable devices is significant (e.g., forty meters), translation of the second moveable device (e.g., at one meter/second) will result in tolerable error (e.g., one-point-four (1.4) degrees). Stated differently, as long as the distance between the two moveable devices is above a threshold, the error will be below a tolerable threshold.

Figure 2A:
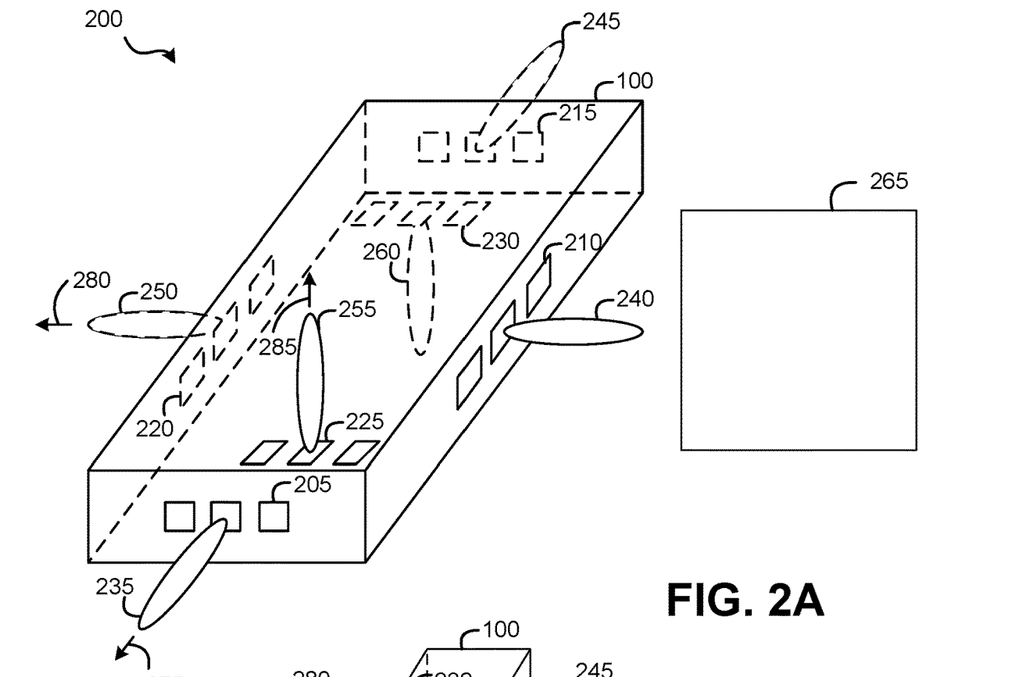
FIGS. 2A & 2B illustrate a diagram of a moveable device before and after a movement depicting antenna arrays and example beams according to one or more embodiments.
Figure 2B:
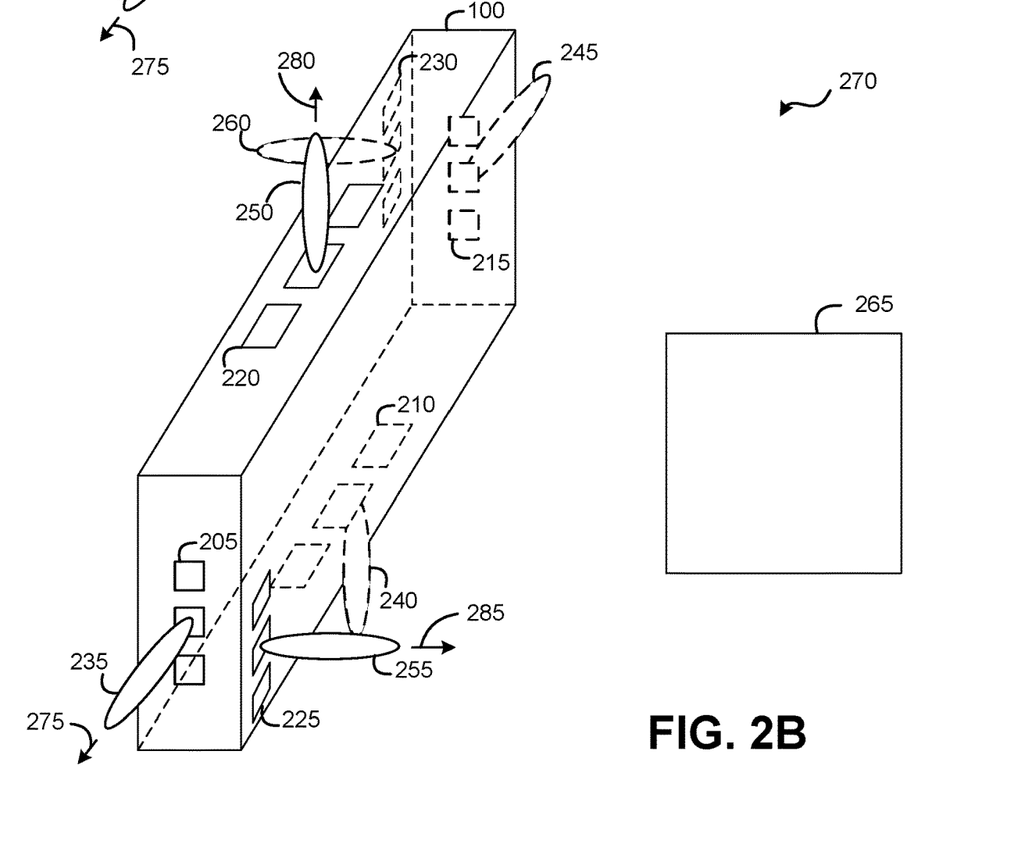

An antenna array, also described as a phased array antenna, includes multiple radiating elements (e.g., antennae) each having a phase shifter. Directional beams are formed by shifting the phase of the signal emitted from each radiating element. The signal emitting from each radiating element may provide constructive or destructive interference with the other signals emitted from the other radiating elements. The amplitude of the signal emitted from each radiating element may also impact the constructive or destructive interference. This interference steers the beams in the desired direction. Accordingly, the beam emitting from an antenna array may be emitted at an angle from the antenna array. For example, as shown in FIGS. 2A and 2B, the beam 240 emitting from antenna array 210 is at a ninety (90) degree angle from antenna array 210. Beams may be configured to emit from approximately thirty (30) degrees to approximately one hundred fifty (150) degrees from antenna array 210 so that the field of view for the beams may be approximately one hundred twenty (120) degrees.

Figure 1:
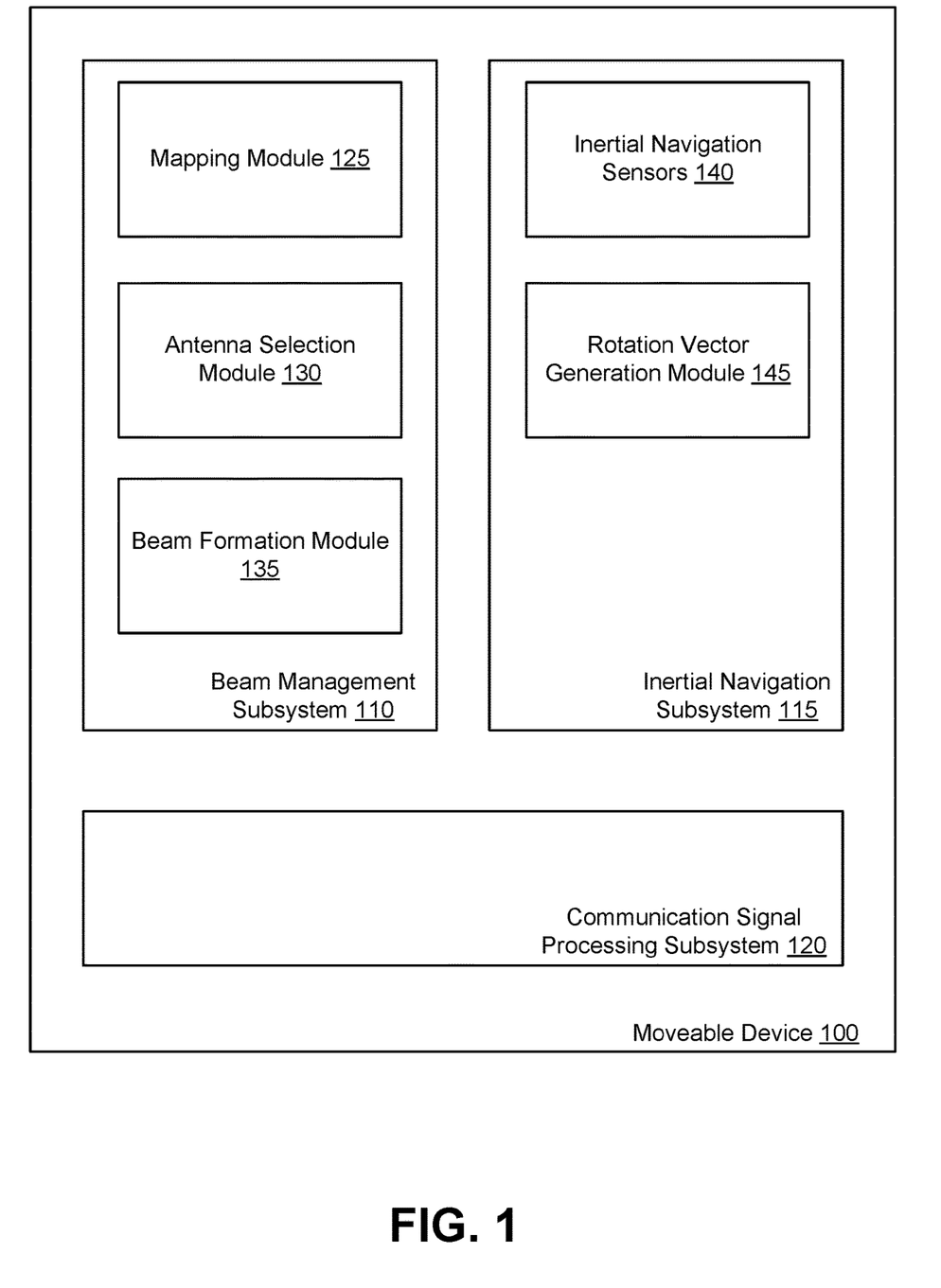
FIG. 1 illustrates a simplified diagram of a moveable device that may incorporate one or more embodiments.

FIG. 1 illustrates a simplified diagram of a moveable device 100 that may incorporate one or more embodiments. Moveable device 100 may include beam management subsystem 110, inertial navigation subsystem 115, and communication signal processing subsystem 120. Moveable device 100 may be any suitable electronic device that is mobile. For example, moveable device 100 may be a smartphone, a tablet, a laptop, a smartwatch, a shipment tracking device, or the like.

Moveable device 100 may have other components and/or subsystems not depicted in the simplified diagram of FIG. 1. For example, moveable device 100 may be a UE such as UE 400 of FIG. 4. Further, moveable device 100 may be any electronic device, such as computer system 500 of FIG. 5, that is moveable or mobile. As an example of additional components, moveable device 100 will include antenna arrays (also called phase arrays) as shown in FIGS. 2A and 2B. The antenna arrays are used to generate beams that are used for communication between the moveable device 100 and a base station or other device on a wireless communication network. The other device may be any receiver, transmitter, or transceiver, such as, for example, a base station or a second moveable device (e.g., a shipment tracking transceiver, a UE, or the like). At high frequencies, including on $5^{th}$ generation (5G) networks using mmWave communication, the antenna array radiation pattern is a beam that is directionally dependent. Therefore, the beam from the antenna array works well when pointed toward (i.e., oriented toward or directed toward) the other device (e.g., a base station, customer premises equipment, other moveable device such as a UE, and the like) with which the moveable device 100 is communicating. As the beam moves, due to the movement of the moveable device 100, the beam may no longer be directed toward the other device, and the signal reception and transmission may accordingly degrade between the two devices. When the signal degrades, the moveable device 100 may no longer be able to communicate on the communication network because it may not be able to send or receive communication signals from the base station via the beam without adjusting which antenna array is used and/or forming a new beam.

Inertial navigation subsystem 115 may include components used to identify, detect, and/or report movement of the moveable device 100. The inertial navigation subsystem 115 may include hardware components, such as inertial navigation sensors 140, and software components such as rotation vector generation module 145. The software components may include instructions stored in a memory of moveable device 100 that can be executed by one or more processors of moveable device 100 to perform the functionality described. While inertial navigation subsystem 115 is depicted as having rotation vector generation module 145 and inertial navigation sensors 140, inertial navigation subsystem 115 may have any number of modules and components. More or fewer modules and components may be used to facilitate the functionality described with respect to inertial navigation subsystem 115.

Inertial navigation sensors 140 may include any hardware, software, and/or firmware, including sensors, capable of detecting movement of the moveable device 110, reporting the movement of the moveable device to the rotation vector generation module 145, and/or determining the rotation vector. Example inertial navigation sensors 140 may include an accelerometer, a magnetometer, and a gyroscope. One or more inertial navigation sensors 140 may be used to detect, identify, measure, and/or report the movement of the moveable device 100.

The functionality described as performed by the rotation vector generation module 145 may be implemented in a software module, a firmware module, hardware, and/or a portion of the inertial navigation sensors 140. The rotation vector generation module 145 may be responsible for generating a rotation vector that characterizes the movement of the moveable device 100. For example, the rotation vector may characterize the change in position of the moveable device 100. This relative change in position may be characterized by a rotation vector that may indicate the change in roll, pitch, and/or yaw of the moveable device 100. In some embodiments, the rotation vector generation module 145 may also characterize translational movement in additional to rotational movement of the moveable device. In some embodiments, the rotation vector may define an absolute position of the moveable device 100 after the movement rather than a relative position change. For example, the absolute position of the moveable device 100 may be characterized in the rotation vector that includes an absolute roll, pitch, and yaw position with respect to a fixed (x, y, z) coordinate system. In some embodiments, the rotation vector generation module 145 or the functionality of generating the rotation vector may be in a separate module or incorporated into one or more inertial navigation sensors 140. Regardless of the location of the functionality implementation, the rotation vector may be provided to the beam management sub system 110.

The inertial navigation subsystem 115 may update the rotation vector rapidly and frequently. For example, the rotation vector may be generated at 100 Hertz. In some embodiments, the rotation vector may be generated at any frequency between, for example, 10 Hertz and 200 Hertz. Each rotation vector that is generated may be provided to the mapping module 125 for beam management subsystem 110 to utilize.

Beam management subsystem 110 may be the subsystem responsible for selecting the antenna array and forming or selecting the beam to use for communication at any given time. Beam management subsystem 110 may include hardware components, software components, firmware components, or combinations thereof. The software components may include instructions stored in a memory of moveable device 100 that can be executed by one or more processors of moveable device 100 to perform the functionality described. Because movement of the moveable device 100 may cause signal degradation (because the beam is no longer directed or pointing toward the base station), beam management subsystem 110 may continuously modify the beam being used (i.e., perform beam optimization). For example, the parameters of the antenna array may be modified to direct the beam to continue to point toward the base station as the moveable device 100 moves, or a different antenna array may be activated to form a different beam pointed toward the base station. Beam management subsystem 110 may use a scanning algorithm to scan the possible beams at each antenna array until an optimized (i.e., the best or the strongest) signal is identified. In some embodiments, the base station and the beam management subsystem 110 of the moveable device 100 communicate to exchange information about the strength of different directions of transmission using the various antenna arrays to select the optimized signal. Once the optimized signal is identified, the beam management subsystem 110 may select the antenna array associated with the optimized signal and form the beam using the selected antenna array with appropriate parameter values to obtain the optimized signal. Forming the beam at the antenna array may include setting parameters of each antennae of the antenna array to form the beam in the desired direction. The parameters may include the phase and amplitude of each signal transmitted by each transmitter.

Beam management subsystem 110 may include a mapping module 125. The mapping module 125 may be a software component. The mapping module 125 may be used during the optimization process to map the rotation vector. Mapping module 125 may receive the rotation vector from inertial navigation subsystem 115. Each time a rotation vector is received, beam management subsystem 110 may be triggered to perform beam optimization including selecting an antenna array and forming a new beam. Such triggering by the rotation vector can ensure moveable device 100 maintains a strong signal. Without the triggering by the rotation vector, a trigger may be that the signal degrades. A user of moveable device 100 may experience poor performance if beam optimization is triggered only upon signal degradation. By using the rotation vector from the inertial navigation subsystem 115, the user avoids performance issues due to signal degradation because the inertial navigation subsystem 115 may update the movement to trigger beam optimization before the signal will degrade. Therefore, when mapping module 125 receives the rotation vector, mapping module 125 uses the rotation vector to determine one or more antenna arrays that support a beam that will be pointed toward or directed toward the base station. For example, the mapping module 125 may calculate a relative direction of the base station from the moveable device using the rotation vector. The mapping module 125 may know the location of the base station with respect to the moveable device 100 at its previous position. Using the rotation vector and the location of the base station at the previous position, the mapping module 125 may calculate the relative direction of the base station from the moveable device. Based on that information, the mapping module can identify one or more antenna arrays that may support a beam directed toward the base station. For example, the rotation vector may provide a relative change in roll, pitch, and/or yaw from the previous position. Mapping module 125 may use this relative change to determine a relative location of the base station with respect to the moveable device 100. The mapping module 125 may use the relative location of the base station to map the antenna arrays that may support a beam that may be used to communicate with the base station. In some embodiments, a predicted future position of the moveable device 100 may be used to determine whether the base station will be relative to the predicted position of the moveable device 100 based on the rotation vector. Predicted future positions may be used, for example, if the rotation vector update speed may be below a threshold value.

Antenna selection module 130 may receive the identified one or more antenna arrays to select a single antenna array and form a beam using the antenna array that is directed toward the base station. Antenna selection module 130 may be a software component. Antenna selection module 130 may use the identified antenna arrays to scan the beams available from those antenna arrays to identify which beam will provide the strongest signal for reception and transmission of communication signals between the moveable device 100 and the base station. Antenna selection module 130 may select the antenna array that will provide the strongest signal based on the scan. The scan may include sending and/or receiving a signal on each of the antenna arrays of the moveable device 100, optimizing the angle of the antenna arrays on the moveable device using phase configurations of each antenna, or a combination thereof. In some embodiment, if no beam will support a sufficiently strong signal (i.e., a beam that exceeds a threshold signal strength) other adjacent antenna arrays' beams may be scanned to find a best signal. By using the rotation vector information to scan the antenna arrays that can generate beams that potentially are directed toward the base station, there is a system performance over systems that use signal degradation as the trigger to scan all antenna arrays for the optimized signal. After antenna selection module 130 selects the antenna array and has identified the beam that will provide the best signal reception and transmission to the base station, antenna selection module can provide the information to beam formation module 135.

Beam formation module 135 may set the parameters (e.g., phase and amplitude) for each transmitter of the selected antenna array. Beam formation module 135 may be a software component. The antenna array (as seen in more detail in FIG. 3) have multiple antennae. Each antenna may have parameters such that the array of antennae work together to form the beam. Beam formation module 135 may set the parameters and activate the antenna array with the parameters as well as correspondingly deactivating the previously used antenna array and/or parameters for the last used beam. The selected parameters may be based on information received during the scan. By setting the parameters and activating the antenna array, beam formation module 135 generates the beam for use to transmit and receive communication signals with the base station.

Communication signal processing subsystem 120 may transmit and/or receive communication signals that are transmitted and/or received via the active antenna array and corresponding beam. The communication signals may be any suitable communication signals used on a wireless communication network such as 5G, fourth generation (4G), third generation (3G), Long-Term Evolution (LTE), WiMax, Universal Mobile Telecommunications Service (UMTS), Global System for Mobile communication (GSM), Code-Division Multiple Access (CDMA), and the like. Communication signal processing subsystem 120 may utilize the antenna array and beam to receive and transmit the communication signals.

In use, moveable device 100 may be capable of sending and receiving communication signals with a transceiver (e.g., base station). The moveable device 100 may have multiple antenna arrays, one of which is active with a beam directed toward the transceiver for transmission and reception of the communication signals. To obtain the initial communication signal, antenna selection module 130 of beam management subsystem 110 may perform an initial scan of all beams available on all antenna arrays to identify the strongest signal between it and the transceiver for communication. Once the strongest signal is identified, beam formation module 135 of beam management subsystem 110 may set the configuration parameters to form the beam and activate the antenna array to generate the strongest beam. After communication is established, the moveable device 100 may be moved, for example from the user's pocket to the user's ear to answer a call coming in on the moveable device 100. The movement may be detected by the inertial navigation sensors 140. The inertial navigation sensors 140 may provide the movement information to the rotation vector generation module 145. The rotation vector generation module 145 may generate a rotation vector that characterizes the movement and provide the rotation vector to the mapping module 125 of the beam management subsystem 110. The mapping module 125 may use the rotation vector to identify the relative location of the transceiver from the moveable device 100. For example, the mapping module 125 may calculate the direction of the transceiver in relation to the moveable device 100 by using the previous beam information to know where the transceiver was located and the rotation vector to determine where the transceiver is located with respect to the moveable device 100 now that the moveable device 100 has moved. The mapping module 125 may map the calculated direction of the transceiver to a subset of the antenna arrays that may form a beam (i.e., a subset of possible beams) that will be pointed toward or directed toward the transceiver. Stated differently, the mapping module 125 may map the movement using the rotation vector based on the identified relative location of the base station to a list of beams that are in the appropriate direction (i.e., directed toward the base station). The list of beams may each have an associated antenna array. The antenna selection module 130 may scan the list of beams to identify which beam is optimal (i.e., will provide the strongest signal). The scanning may include transmitting and/or receiving a signal from the transceiver with each beam to find the strongest beam. To transmit and/or receive a signal using each beam, the configuration parameters for each antenna array associated with the beam may be set to form the beam temporarily for scanning purposes. The antenna selection module 130 may select the strongest beam and associated antenna array. Beam formation module 135 may then activate the selected antenna array and set the appropriate configuration parameters to generate the strongest beam for communication. Communication signal processing subsystem 120 may receive communication signals for processing that are received via the beam.

The inertial navigation subsystem 115 may provide the rotation vector at a speed and frequency of, for example, 100 Hertz. Accordingly, the process described above (to sense movement, select a different beam, and activate the beam) may be performed multiple times between the user grasping his or her moveable device 100 (e.g., smartphone) from the user's pocket and moving it to the user's ear to, for example, answer a call.

FIG. 2A illustrates a diagram 200 of a base station 265 and the moveable device 100 further depicting antenna arrays 205, 210, 215, 220, 225, and 235 and example beams 235, 240, 245, 250, 255, and 260.

Moveable device 100 is depicted with an antenna array 205, 210, 215, 220, 225, and 230 on each surface of moveable device 100. However, moveable device 100 may have more or fewer antenna arrays 205, 210, 215, 220, 225, and 230. Antenna arrays 205, 210, 215, 220, 225, and 230 may be wireless communication antenna 432. In some embodiments, there may be more antenna arrays 205, 210, 215, 220, 225, and 230 on each surface. In some embodiments, there may not be an antenna array 205, 210, 215, 220, 225, and 230 on every surface. The antenna arrays 205, 210, 215, 220, 225, and 230 depicted in FIG. 2A each include three antennae. In some embodiments each antenna array 205, 210, 215, 220, 225, and 230 may have more or fewer individual antennae per antenna array 205, 210, 215, 220, 225, and 230. In some embodiments, the antenna arrays 205, 210, 215, 220, 225, and 235 may have a different number of individual antennae in various antenna arrays 205, 210, 215, 220, 225, and 230. For example, antenna array 205 may have three individual antennae, but antenna array 225 may have six individual antennae.

Beams 235, 240, 245, 250, 255, and 260 depict example beams for each antenna array 205, 210, 215, 220, 225, and 230. In the example moveable device 100, beam 235 is associated with antenna array 205, beam 240 is associated with antenna array 210, beam 245 is associated with antenna array 215, beam 250 is associated with antenna array 220, beam 255 is associated with antenna array 225, and beam 260 is associated with antenna array 230. The parameters of antenna array 205 may be configured to generate beam 235, for example. In this example, beam 240, generated by antenna array 210 is directed toward base station 265.

Also included in FIG. 2A is an indication of roll, pitch, and yaw. As an example, rotation around directional arrow 275 may indicate roll. Rotation around direction arrow 280 may indicate pitch. Rotation around directional arrow 285 may indicate yaw.

FIG. 2B illustrates a diagram 270 of base station 265 and the moveable device 100 oriented in a different direction because it has been moved. Using the example of FIGS. 2A and 2B, a user may have rotated the moveable device from the position illustrated in FIG. 2A (position one) to the position illustrated in FIG. 2B (position two). Base station 265 remains in a fixed position. Using the directional arrows 275, 208, 285, there has been a change in roll. Upon the movement from the position one to position two, inertial navigation sensors 140 may detect and capture the movement (i.e., the change in roll). Rotation vector generation module 145 may then generate a rotation vector to characterize the movement. Mapping module 125 may receive the rotation vector and map the rotation vector to identify antenna array 225 as at least one antenna array that is possibly capable of generating a beam directed toward base station 265. In some embodiments multiple beams 255 may be generated using antenna array 225. In some embodiments, other antenna arrays may also be identified as possible antenna arrays depending on the orientation of moveable device 100. For example, antenna array 210 and antenna array 215 may also be identified. Antenna selection module 130 may scan the possible beams from antenna array 225 to identify the optimal or best beam, which may be beam 255. Beam formation module 135 may activate antenna array 225 and generate beam 255 using antenna array 225. Communication signal processing subsystem 120 may then obtain and process communication signals received from base station 265 via beam 255.

Figure 3:
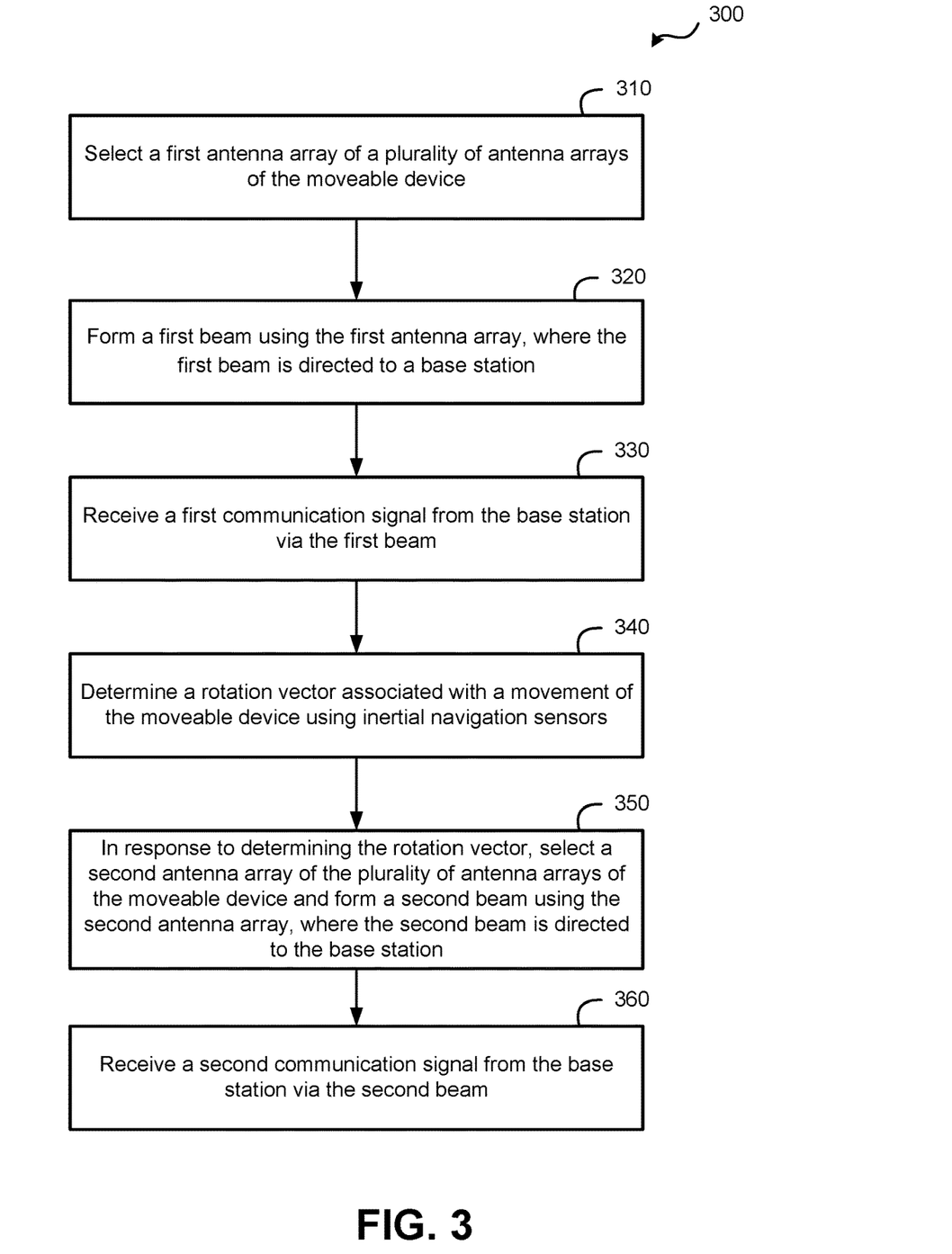
FIG. 3 illustrates a flow diagram of a method for beam management according to an embodiment.

FIG. 3 is a flow diagram of a method 300 for beam management, according to an embodiment. It can be noted that, as with figures appended hereto, FIG. 3 is provided as a non-limiting example. Other embodiments may vary, depending on desired functionality. For example, the functional blocks illustrated in method 300 may be combined, separated, or rearranged to accommodate different embodiments. The method 300 may be performed by a moveable device, such as the moveable device 100 of FIG. 1, the UE 400 of FIG. 4, and/or the computer system 500 of FIG. 5. Means for performing the functionality of method 300 may include hardware and/or software means of a moveable device, such as the UE 400 of FIG. 4 or the computer system 500 of FIG. 5.

The functionality at block 310 comprises selecting a first antenna array of a plurality of antenna arrays of the moveable device. For example, a first antenna array (e.g., antenna array 210 of FIG. 2A) may be selected to generate a beam (e.g., beam 240 of FIG. 2A) directed to a base station (e.g., base station 265 of FIG. 2A) to establish or maintain communication signal exchange. Means for performing the functionality at block 310 can include, for example, antenna selection module 130 and/or other hardware and/or software components of the moveable device 100 and described herein.

The functionality at block 320 comprises forming a first beam using the first antenna array, where the first beam is directed toward a base station. For example, the first antenna array parameters may be configured to form a first beam (e.g., beam 240 of FIG. 2A) for exchanging communication signals with the base station (e.g., base station 265 of FIG. 2A). Means for performing the functionality at block 320 can include, for example, beam formation module 135 and/or other hardware and/or software components of the moveable device 100 and described herein.

The functionality at block 330 comprises receiving a first communication signal from the base station via the first beam. Means for performing the functionality at block 330 can include, for example, communication signal processing subsystem 120, antenna arrays 205, 210, 215, 220, 225, and 230, and/or other hardware and/or software components of the moveable device 100 and described herein.

The functionality at block 340 comprises determine a rotation vector associated with a movement of the moveable device using inertial navigation sensors. As previously described, the moveable device may move either rotationally and/or translationally. The inertial navigation sensors (e.g., accelerometer, gyroscope, and/or magnetometer) can detect and measure the movement of the moveable device. A rotation vector can be generated that characterizes the rotational movement (e.g., roll, pitch, and/or yaw) of the moveable device, and information that characterizes the translational movement of the moveable device may also be generated. For example, the moveable device 100 of FIG. 2A may change to the position depicted in FIG. 2B. The rotation vector may characterize the movement. In some embodiments, the rotation vector indicates a relative orientation of the moveable device as compared to the previous orientation of the moveable device (e.g., a change in roll, pitch, and/or yaw). In some embodiments, the rotation vector may indicate an absolute orientation of the moveable device. For example, roll, pitch, and yaw coordinates using a fixed coordinate system may indicate the absolute orientation of the moveable device. In some embodiments, the rotation vector may characterize a predicted future movement of the moveable device based on the captured movement. For example, the direction and velocity and/or acceleration of the moveable device may indicate a future position of the moveable device. The predicted location may be used, in some embodiments, rather than the detected position. Means for performing the functionality at block 340 can include, for example, inertial navigation sensors 140, rotation vector generation module 145, inertial navigation subsystem 115, and/or other hardware and/or software components of the moveable device 100 and described herein.

The functionality at block 350 comprises, in response to determining the rotation vector, select a second antenna array of the plurality of antenna arrays of the moveable device and form a second beam using the second antenna array, where the second beam is directed to the base station. For example, the rotation vector can be used to determine where the base station is relative to the orientation of the moveable device after the movement. For example, the rotation vector may be used to determine the orientation of the moveable device based on the new position. The orientation may be mapped to identify a subset of possible beams and their associated antenna arrays that may be used to generate a beam directed toward the base station. Once the subset of possible beams is identified, the possible beams may be scanned to identify the optimized (i.e., best or strongest) signal, which is used to select the antenna array (e.g., antenna array 225 of FIG. 2B) and beam (e.g., beam 255 of FIG. 2B) that may be used to obtain the optimized signal. The antenna array may be activated and the appropriate configurations set to form the selected beam directed toward the base station (e.g., base station 265 of FIG. 2B). In some embodiments, the movement of the moveable device may be such that the same antenna array may be used for the second antenna array as the first antenna array. For example, if the movement results in the same antenna array still generating the best beam positioned toward the base station, the same antenna array may be used to generate the second beam (after the movement) as the antenna array used to generate the first beam (before the movement). In some embodiments, a different antenna array may be used for the second beam. Means for performing the functionality at block 350 can include, for example, mapping module 125, antenna selection module 130, beam formation module 135, beam management subsystem 110, and/or other hardware and/or software components of the moveable device 100 and described herein.

The functionality at block 360 comprises receiving a second communication signal from the base station via the second beam. Means for performing the functionality at block 330 can include, for example, communication signal processing subsystem 120, antenna arrays 205, 210, 215, 220, 225, and 230, and/or other hardware and/or software components of the moveable device 100 and described herein.

Figure 4:
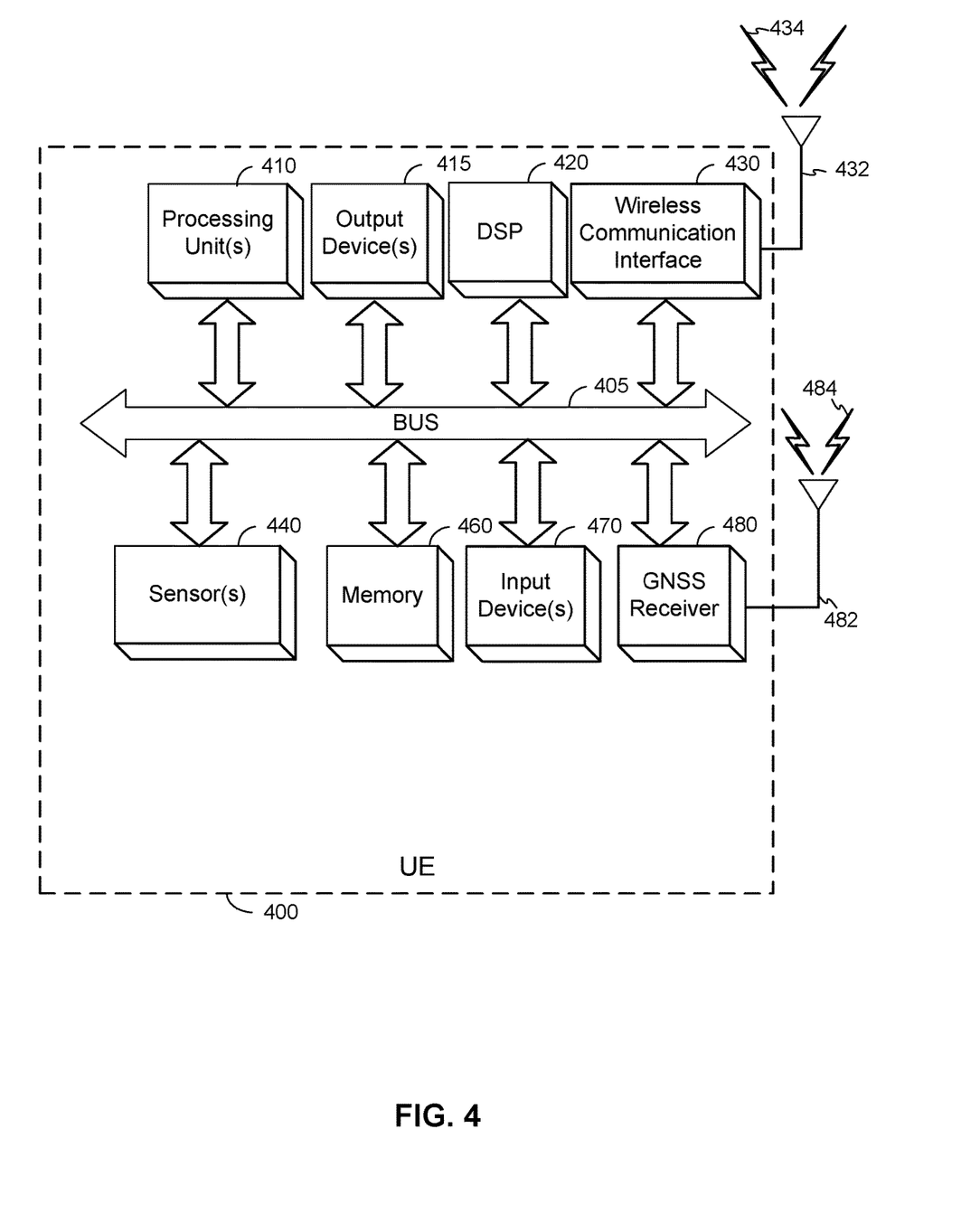
FIG. 4 illustrates an embodiment of a user equipment (UE)

FIG. 4 illustrates an embodiment of a UE 400, which can be utilized as described in the embodiments described herein and in association with FIGS. 1-3. It should be noted that FIG. 4 is meant only to provide a generalized illustration of various components of UE 400, any or all of which may be utilized as appropriate. In other words, because UEs can vary widely in functionality, they may include only a portion of the components shown in FIG. 4. It can be noted that, in some instances, components illustrated by FIG. 4 can be localized to a single physical device and/or distributed among various networked devices, which may be disposed at different physical locations.

The UE 400 is shown comprising hardware elements that can be electrically coupled via a bus 405 (or may otherwise be in communication, as appropriate). The hardware elements may include a processing unit(s) 410 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 4, some embodiments may have a separate DSP 420, depending on desired functionality. The UE 400 also may comprise one or more input devices 470, which may comprise without limitation one or more touch screens, touch pads, microphones, buttons, dials, switches, and/or the like; and one or more output devices 415, which may comprise without limitation, one or more displays, light emitting diodes (LEDs), speakers, and/or the like.

The UE 400 might also include a wireless communication interface 430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, cellular communication facilities, etc.), and/or the like, which may enable the UE 400 to communicate via the networks described herein with regard to FIGS. 1-3. The wireless communication interface 430 may permit data to be communicated with a network, eNBs, ng-eNBs, gNBs, and/or other network components, computer systems, and/or any other electronic devices described herein. The communication can be carried out via one or more wireless communication antenna(s) 432 that send and/or receive wireless signals 434.

Depending on desired functionality, the wireless communication interface 430 may comprise separate transceivers to communicate with base stations (e.g., eNBs, ng-eNBs and/or gNBs) and other terrestrial transceivers, such as wireless devices and access points. The UE 400 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (WCDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, New Radio (NR) and so on. 5G, LTE, LTE Advanced, NR, GSM, and WCDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 400 can further include sensor(s) 440. Such sensors may comprise, without limitation, one or more inertial sensors (e.g., accelerometer(s), gyroscope(s), and or other Inertial Measurement Units (IMUs)), camera(s), magnetometer(s), compass, altimeter(s), microphone(s), proximity sensor(s), light sensor(s), barometer, and the like, some of which may be used to complement and/or facilitate the functionality described herein.

Embodiments of the UE 400 may also include a GNSS receiver 480 capable of receiving signals 484 from one or more GNSS satellites (e.g., SVs 190) using an GNSS antenna 482 (which may be combined in some implementations with antenna(s) 432). Such positioning can be utilized to complement and/or incorporate the techniques described herein. The GNSS receiver 480 can extract a position of the UE 400, using conventional techniques, from GNSS SVs (e.g. SVs 190) of an GNSS system, such as Global Positioning System (GPS), Galileo, GLONASS, Compass, Quasi-Zenith Satellite System (QZSS) over Japan, Indian Regional Navigational Satellite System (IRNSS) over India, Beidou over China, and/or the like. Moreover, the GNSS receiver 480 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

The UE 400 may further include and/or be in communication with a memory 460. The memory 460 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 460 of the UE 400 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the UE 400 (e.g., using processing unit(s) 410). In an aspect, then, such code and/or instructions can be used to configure and/or adapt a general purpose computer (or other device) to perform one or more operations in accordance with the described methods.

Figure 5:
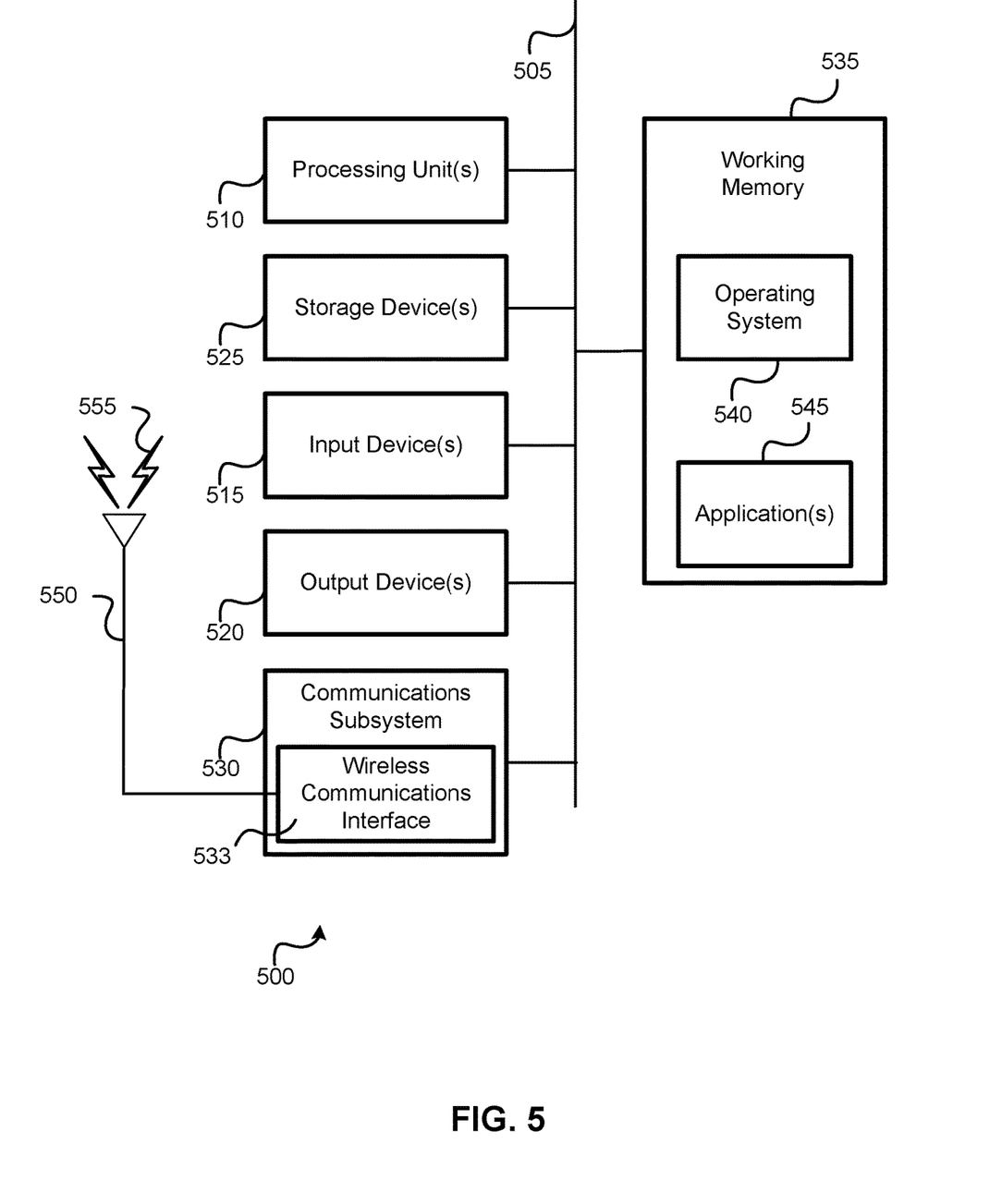
FIG. 5 illustrates an embodiment of a computer system.

FIG. 5 is a block diagram of an embodiment of a computer system 500, which may be used, in whole or in part, to provide the functions of one or more network components as described in the embodiments herein (e.g., moveable device 100). It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner. In addition, it can be noted that components illustrated by FIG. 5 can be localized to a single device and/or distributed among various networked devices, which may be disposed at different geographical locations.

The computer system 500 is shown comprising hardware elements that can be electrically coupled via a bus 505 (or may otherwise be in communication, as appropriate). The hardware elements may include processing unit(s) 510, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 500 also may comprise one or more input devices 515, which may comprise without limitation a mouse, a keyboard, a camera, a microphone, and/or the like; and one or more output devices 520, which may comprise without limitation a display device, a printer, and/or the like.

The computer system 500 may further include (and/or be in communication with) one or more non-transitory storage devices 525, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 500 may also include a communications subsystem 530, which may comprise wireless communication technologies managed and controlled by a wireless communication interface 533, as well as wired technologies (such as Ethernet, coaxial communications, universal serial bus (USB), and the like). The wireless communication interface 533 may send and receive wireless signals 555 (e.g. signals according to 5th Generation New Radio (5G NR) or LTE) via wireless antenna(s) 550. Thus the communications subsystem 530 may comprise a modem, a network card (wireless or wired), an infrared communication device, a wireless communication device, and/or a chipset, and/or the like, which may enable the computer system 500 to communicate on any or all of the communication networks described herein to any device on the respective network, including a User Equipment (UE), other computer systems (e.g., moveable device 100), and/or any other electronic devices described herein. Hence, the communications subsystem 530 may be used to receive and send data as described in the embodiments herein.

In many embodiments, the computer system 500 will further comprise a working memory 535, which may comprise a RAM or ROM device, as described above. Software elements, shown as being located within the working memory 535, may comprise an operating system 540, device drivers, executable libraries, and/or other code, such as one or more applications 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 525 described above. In some cases, the storage medium might be incorporated within a computer system, such as computer system 500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

Figure 6:
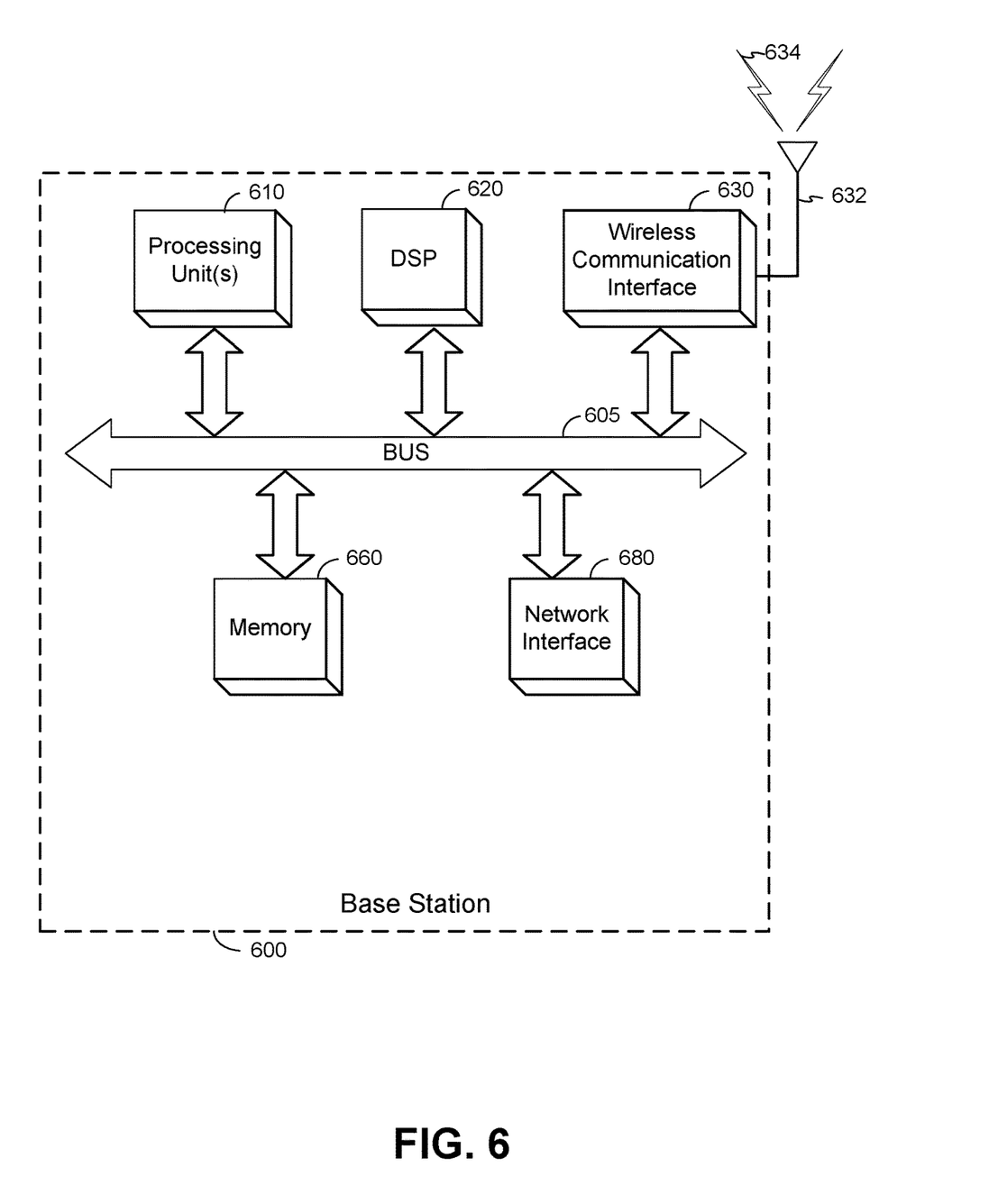
FIG. 6 illustrates an embodiment of a base station.

FIG. 6 illustrates an embodiment of a base station 600, which can be utilized as described herein (e.g., in association with FIGS. 1-3). It should be noted that FIG. 6 is meant only to provide a generalized illustration of various components, any or all of which may be utilized as appropriate. In some embodiments, the base station 600 may correspond to a gNB, an ng-eNB, and/or an eNB as described herein above.

The base station 600 is shown comprising hardware elements that can be electrically coupled via a bus 605 (or may otherwise be in communication, as appropriate). The hardware elements may include a processing unit(s) 610 which can include without limitation one or more general-purpose processors, one or more special-purpose processors (such as DSP chips, graphics acceleration processors, ASICs, and/or the like), and/or other processing structure or means. As shown in FIG. 6, some embodiments may have a separate DSP 620, depending on desired functionality. Location determination and/or other determinations based on wireless communication may be provided in the processing unit(s) 610 and/or wireless communication interface 630 (discussed below), according to some embodiments. The base station 600 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 600 might also include a wireless communication interface 630, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMAX device, cellular communication facilities, etc.), and/or the like, which may enable the base station 600 to communicate as described herein. The wireless communication interface 630 may permit data and signaling to be communicated (e.g. transmitted and received) UEs, other base stations (e.g., eNBs, gNBs, and ng-eNBs), and/or other network components, computer systems, and/or any other electronic devices described herein. The communication can be carried out via one or more wireless communication antenna(s) 632 that send and/or receive wireless signals 634.

The base station 600 may also include a network interface 680, which can include support of wireline communication technologies. The network interface 680 may include a modem, network card, chipset, and/or the like. The network interface 680 may include one or more input and/or output communication interfaces to permit data to be exchanged with a network, communication network servers, computer systems, and/or any other electronic devices described herein.

In many embodiments, the base station 600 will further comprise a memory 660. The memory 660 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 660 of the base station 600 also can comprise software elements (not shown in FIG. 6), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 660 that are executable by the base station 600 (and/or processing unit(s) 610 or DSP 620 within base station 600). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets or the like), or both. Further, connection to other computing devices, such as network input/output devices, may be employed.

With reference to the appended figures, components that can include memory can include non-transitory machine-readable media. The terms "machine-readable medium," "computer-readable medium," "computer-readable memory device," and "machine readable media" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, RAM, PROM, EPROM, EEPROM, FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples. For example, future networks beyond fifth generation (5G) networks may implement embodiments herein.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that, throughout this Specification, discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device. It is understood that a general purpose computer can become a special purpose computer by virtue of installation and execution of software/code/executable instructions that perform such above described actions or processes, such as, for example, the method described in FIG. 3.

The terms "and" and "or" as used herein may include a variety of meanings that may depend, at least in part, upon the context in which such terms are used. Typically, the term "or," if used to associate a list (e.g., A, B, or C), is intended to (and may) mean A, B, and C, here used in the inclusive sense, as well as A, B, or C, here used in the exclusive sense. Similarly, the term "and," if used to associate a list (e.g., A, B, and C), is intended to (and may) mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, and so forth.

Having described several embodiments, it is understood that various modifications, alternative constructions, and equivalents may be used without departing from the spirit of this disclosure. For example, the above elements may merely be a component of a larger system, wherein, for example, other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method for beam management, the method comprising:
    selecting, using a beam management subsystem of a moveable device, a first antenna array of a plurality of antenna arrays of the moveable device;
    forming, using the beam management subsystem, a first beam using the first antenna array, wherein the first beam is directed toward a transceiver;
    receiving, at the moveable device via the first beam, a first communication signal from the transceiver;
    determining, using an inertial navigation subsystem of the moveable device, a rotation vector associated with a movement of the moveable device, the inertial navigation subsystem comprising one or more inertial navigation sensors used to detect the movement of the moveable device;
    in response to receiving, by the beam management subsystem, the rotation vector from the inertial navigation subsystem:
        mapping, by the beam management subsystem, a direction of the transceiver to a subset of possible beams associated with a subset of antenna arrays of the plurality of antenna arrays;
        scanning, by the beam management subsystem, the subset of possible beams associated with the subset of antenna arrays of the plurality of antenna arrays to identify a second beam for communicating with the transceiver, the second beam being a strongest beam from the subset of possible beams;
        selecting, by the beam management subsystem based on the scanning of the subset of possible beams, a second antenna array from the subset of antenna arrays that supports the second beam to maintain a quality of signal strength of the first communication signal with the transceiver; and
        forming, by the beam management subsystem, the second beam using the second antenna array, wherein the second beam is directed toward the transceiver; and
    receiving, at the moveable device via the second beam, a second communication signal from the transceiver.

2. The method for beam management of claim 1, wherein forming the second beam comprises calculating a relative direction of the transceiver from the moveable device using the rotation vector.

3. The method for beam management of claim 1, wherein the one or more inertial navigation sensors comprise one or more of an accelerometer, a gyroscope, and a magnetometer.

4. The method for beam management of claim 1, wherein the rotation vector indicates a relative orientation of the moveable device.

5. The method for beam management of claim 1, wherein the rotation vector indicates an absolute orientation of the moveable device.

6. The method for beam management of claim 1, wherein selecting the second antenna array comprises:
    mapping, using the rotation vector, the movement of the moveable device to a subset of possible beams, the subset of possible beams comprising the second beam.

7. The method for beam management of claim 1, wherein the first antenna array and the second antenna array are the same antenna array.

8. The method for beam management of claim 1, wherein the rotation vector characterizes rotational movement of the moveable device, the rotational movement comprising a change in at least one of roll, pitch, and yaw.

9. The method for beam management of claim 1, further comprising:
    determining, using the inertial navigation subsystem of the moveable device, information that characterizes translational movement of the moveable device, wherein:
    the selecting the second antenna array is further based on the information that characterizes the translational movement of the moveable device; and
    the forming the second beam is further based on the information that characterizes the translational movement of the moveable device.

10. The method for beam management of claim 1, wherein selecting the second antenna array comprises predicting, using the rotation vector, a future orientation of the moveable device.

11. The method for beam management of claim 1, further comprising:
    calculating, by the beam management subsystem, the direction of the transceiver in relation to the moveable device using the rotation vector;
    identifying configuration parameters for the strongest beam; and
    generating the strongest beam using the configuration parameters.

12. A moveable device comprising:
- a plurality of antenna arrays capable of transmitting and receiving signals;
- one or more inertial navigation sensors capable of detecting movement of the moveable device;
- one or more processors; and
- a memory having stored thereon instructions that, when executed by the one or more processors, cause the one or more processors to:
  - select a first antenna array of the plurality of antenna arrays of the moveable device;
  - form a first beam using the first antenna array, wherein the first beam is directed toward a transceiver;
  - receive, via the first beam, a first communication signal from the transceiver;
  - determine a rotation vector associated with a movement of the moveable device, wherein the movement is detected and reported by the one or more inertial navigation sensors;
  - in response to determining the rotation vector:
    - map a direction of the transceiver to a subset of possible beams associated with a subset of antenna arrays of the plurality of antenna arrays;
    - scan the subset of possible beams associated with the subset of antenna arrays of the plurality of antenna arrays to identify a second beam for communicating with the transceiver, the second beam being a strongest beam from the subset of possible beams;
    - select, based on the scan of the subset of possible beams, a second antenna array from the subset of antenna arrays that supports the second beam to maintain a quality of signal strength of the first communication signal with the transceiver; and
    - form the second beam using the second antenna array, wherein the second beam is directed toward the transceiver; and
  - receive, via the second beam, a second communication signal from the transceiver.

13. The moveable device of claim 12, wherein, to form the second beam, the instructions comprise further instructions that, when executed by the one or more processors, cause the one or more processors to calculate a relative direction of the transceiver from the moveable device using the rotation vector.

14. The moveable device of claim 12, wherein the one or more inertial navigation sensors comprise one or more of an accelerometer, a gyroscope, and a magnetometer.

15. The moveable device of claim 12, wherein the rotation vector indicates a relative orientation of the moveable device.

16. The moveable device of claim 12, wherein the rotation vector indicates an absolute orientation of the moveable device.

17. The moveable device of claim 12, wherein, to select the second antenna array, the instructions comprise further instructions that, when executed by the one or more processors, cause the one or more processors to map, using the rotation vector, the movement of the moveable device to a subset of possible beams, the subset of possible beams comprising the second beam.

18. The moveable device of claim 12, wherein the first antenna array and the second antenna array are the same antenna array.

19. The moveable device of claim 12, wherein the rotation vector characterizes rotational movement of the moveable device, the rotational movement comprising a change in at least one of roll, pitch, and yaw.

20. The moveable device of claim 12, wherein:
- the instructions comprise further instructions that, when executed by the one or more processors, cause the one or more processors to determine information that characterizes translational movement of the moveable device;
- to select the second antenna array, the instructions comprise further instructions that, when executed by the one or more processors, cause the one or more processors to select the second antenna array based on the information that characterizes the translational movement of the moveable device; and
- to form the second beam, the instructions comprise further instructions that, when executed by the one or more processors, cause the one or more processors to form the second beam based on the information that characterizes the translational movement of the moveable device.

21. The moveable device of claim 12, wherein the instructions comprise further instructions that, when executed by the one or more processors, cause the one or more processors to:
- calculate the direction of the transceiver in relation to the moveable device using the rotation vector;
- identify configuration parameters for the strongest beam; and
- generate the strongest beam using the configuration parameters.

* * * * *